US012334996B2

(12) United States Patent
Prasad et al.

(10) Patent No.: US 12,334,996 B2
(45) Date of Patent: Jun. 17, 2025

(54) MULTIPLE ACCESS POINT (AP) ASSOCIATION

(71) Applicant: QUALCOMM Incorporated, San Diego, CA (US)

(72) Inventors: Narayan Prasad, Westfield, NJ (US); Yavuz Yapici, Florham Park, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

(21) Appl. No.: 18/154,004

(22) Filed: Jan. 12, 2023

(65) Prior Publication Data

US 2024/0243777 A1    Jul. 18, 2024

(51) Int. Cl.
*H04B 7/024* (2017.01)
*H04B 7/0408* (2017.01)
*H04B 7/06* (2006.01)

(52) U.S. Cl.
CPC .......... *H04B 7/024* (2013.01); *H04B 7/0408* (2013.01); *H04B 7/0617* (2013.01)

(58) Field of Classification Search
CPC ..... H04B 7/024; H04B 7/0408; H04B 7/0617
USPC ........................................................ 375/267
See application file for complete search history.

(56) References Cited

U.S. PATENT DOCUMENTS

2007/0055502 A1* 3/2007 Preuss ..................... G10L 19/20
704/219

FOREIGN PATENT DOCUMENTS

WO    2021260047 A1    12/2021
WO    2023272682 A1    1/2023

OTHER PUBLICATIONS

International Search Report and Written Opinion—PCT/US2023/086176—ISA/EPO—May 7, 2024.
Laue F., et al., "Performance Tradeoff of RIS Beam Training: Overhead vs. Achievable SNR", 2022 56th Asilomar Conference on Signals, Systems, and Computers, IEEE, Oct. 31, 2022, pp. 408-412, XP034303762, Section IV-A.

* cited by examiner

*Primary Examiner* — Leila Malek
(74) *Attorney, Agent, or Firm* — Arent Fox, LLP

(57) ABSTRACT

Aspects of the disclosure are directed to an apparatus configured for wireless communication. In certain aspects, the apparatus is configured to obtain, from a network node, a first codeword indicating a first incident direction of a first beam and a first reflected direction of a second beam, the first codeword being one of at least one codeword of a stage-1 codebook. In certain aspects, the apparatus is configured to obtain, from the network node, a second codeword of a stage-2 codebook, the stage-2 codebook being associated with the first codeword, the second codeword indicating a parameter of the second beam. In certain aspects, the apparatus is configured to update the second beam according to the parameter indicated by the second codeword.

18 Claims, 12 Drawing Sheets

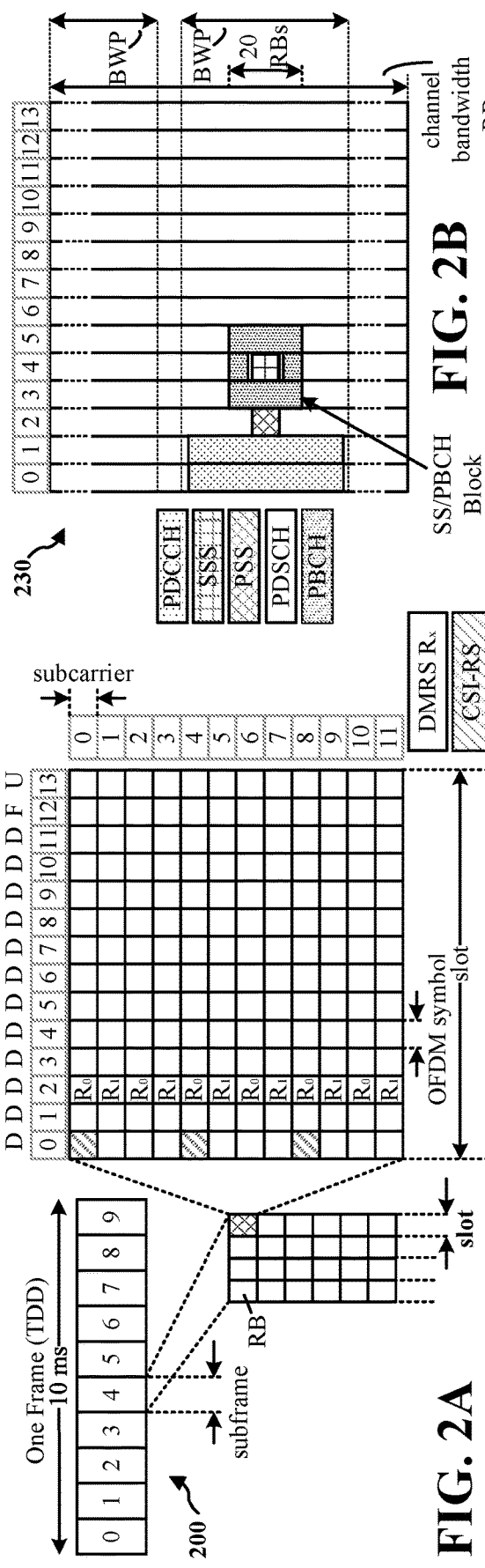
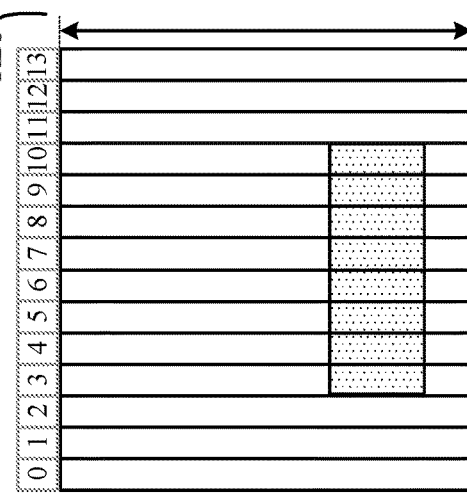
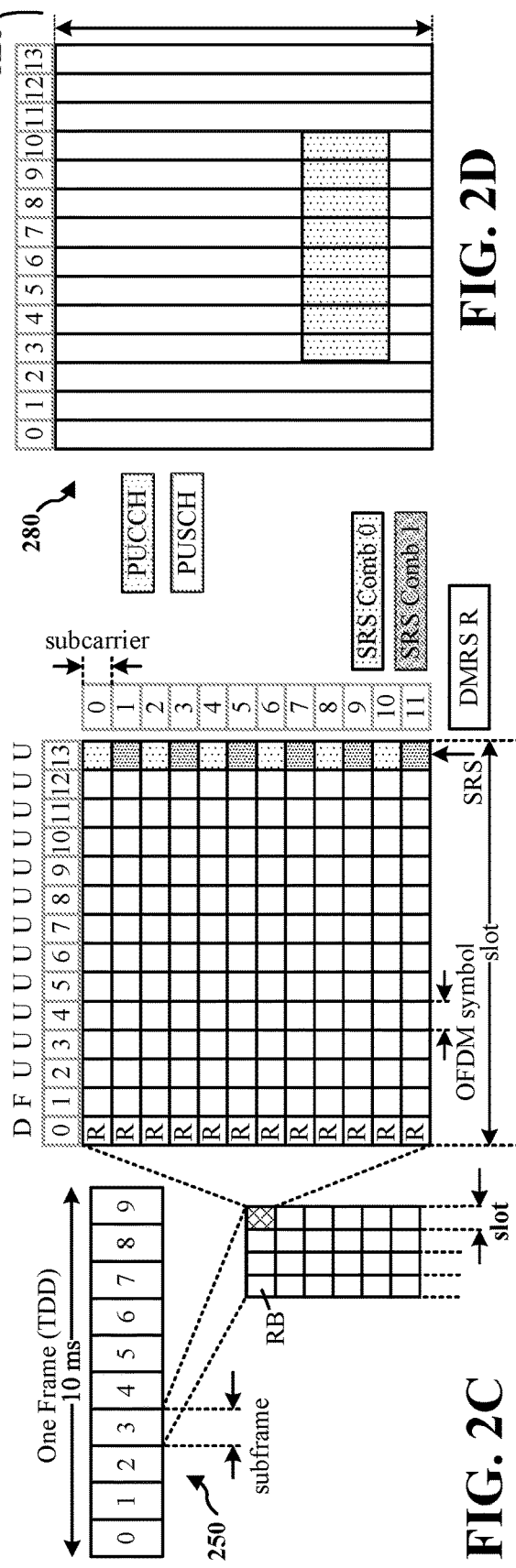
FIG. 2A  FIG. 2B  FIG. 2C  FIG. 2D

MULTIPLE ACCESS POINT (AP) ASSOCIATION

BACKGROUND

Technical Field

The present disclosure generally relates to communication systems, and more particularly, to association between a wireless device and multiple access points (APs).

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus configured for wireless communication. In some examples, the apparatus includes a memory comprising instructions and one or more processors configured to execute the instructions. In some examples, the one or more processors may cause the apparatus to obtain, from a network node, a first codeword indicating a first incident direction of a first beam and a first reflected direction of a second beam, the first codeword being one of at least one codeword of a stage-1 codebook. In some examples, the one or more processors may cause the apparatus to obtain, from the network node, a second codeword of a stage-2 codebook, the stage-2 codebook being associated with the first codeword, the second codeword indicating a parameter of the second beam. In some examples, the one or more processors may cause the apparatus to update the second beam according to the parameter indicated by the second codeword.

Certain aspects are directed to an apparatus configured for wireless communication. In some examples, the apparatus includes a memory comprising instructions and one or more processors configured to execute the instructions. In some examples, the one or more processors may cause the apparatus to output, for transmission to a device, a first codeword indicating a first incident direction of a first beam and a first reflected direction a second beam, the first codeword being one of at least one codeword of a stage-1 codebook. In some examples, the one or more processors may cause the apparatus to output, for transmission to the device, a second codeword of a stage-2 codebook, the stage-2 codebook being associated with the first codeword, the second codeword indicating a parameter of the second beam.

Certain aspects are directed to a method for wireless communication at a reconfigurable intelligent surface (RIS). In some examples, the method includes obtaining, from a network node, a first codeword indicating a first incident direction of a first beam and a first reflected direction of a second beam, the first codeword being one of at least one codeword of a stage-1 codebook. In some examples, the method includes obtaining, from the network node, a second codeword of a stage-2 codebook, the stage-2 codebook being associated with the first codeword, the second codeword indicating a parameter of the second beam. In some examples, the method includes updating the second beam according to the parameter indicated by the second codeword.

Certain aspects are directed to a method for wireless communication at a network node. In some examples, the method includes outputting, for transmission to a device, a first codeword indicating a first incident direction of a first beam and a first reflected direction a second beam, the first codeword being one of at least one codeword of a stage-1 codebook. In some examples, the method includes outputting, for transmission to the device, a second codeword of a stage-2 codebook, the stage-2 codebook being associated with the first codeword, the second codeword indicating a parameter of the second beam.

Certain aspects are directed to an apparatus for wireless communication. In some examples, the apparatus includes means for obtaining, from a network node, a first codeword indicating a first incident direction of a first beam and a first reflected direction of a second beam, the first codeword being one of at least one codeword of a stage-1 codebook. In some examples, the apparatus includes means for obtaining, from the network node, a second codeword of a stage-2 codebook, the stage-2 codebook being associated with the first codeword, the second codeword indicating a parameter of the second beam. In some examples, the apparatus includes means for updating the second beam according to the parameter indicated by the second codeword.

Certain aspects are directed to an apparatus for wireless communication at a network node. In some examples, the apparatus includes outputting, for transmission to a device, a first codeword indicating a first incident direction of a first beam and a first reflected direction a second beam, the first codeword being one of at least one codeword of a stage-1 codebook. In some examples, the apparatus includes means for outputting, for transmission to the device, a second codeword of a stage-2 codebook, the stage-2 codebook being associated with the first codeword, the second codeword indicating a parameter of the second beam.

Certain aspects are directed to a non-transitory computer-readable medium having instructions stored thereon that, when executed by an apparatus, cause the apparatus to perform operations. In some examples, the operations include obtaining, from a network node, a first codeword indicating a first incident direction of a first beam and a first reflected direction of a second beam, the first codeword being one of at least one codeword of a stage-1 codebook. In some examples, the operations include obtaining, from the network node, a second codeword of a stage-2 codebook, the stage-2 codebook being associated with the first codeword, the second codeword indicating a parameter of the second beam. In some examples, the operations include updating the second beam according to the parameter indicated by the second codeword.

Certain aspects are directed to a non-transitory computer-readable medium having instructions stored thereon that, when executed by an apparatus, cause the apparatus to perform operations. In some examples, the operations include outputting, for transmission to a device, a first codeword indicating a first incident direction of a first beam and a first reflected direction a second beam, the first codeword being one of at least one codeword of a stage-1 codebook. In some examples, the operations include outputting, for transmission to the device, a second codeword of a stage-2 codebook, the stage-2 codebook being associated with the first codeword, the second codeword indicating a parameter of the second beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
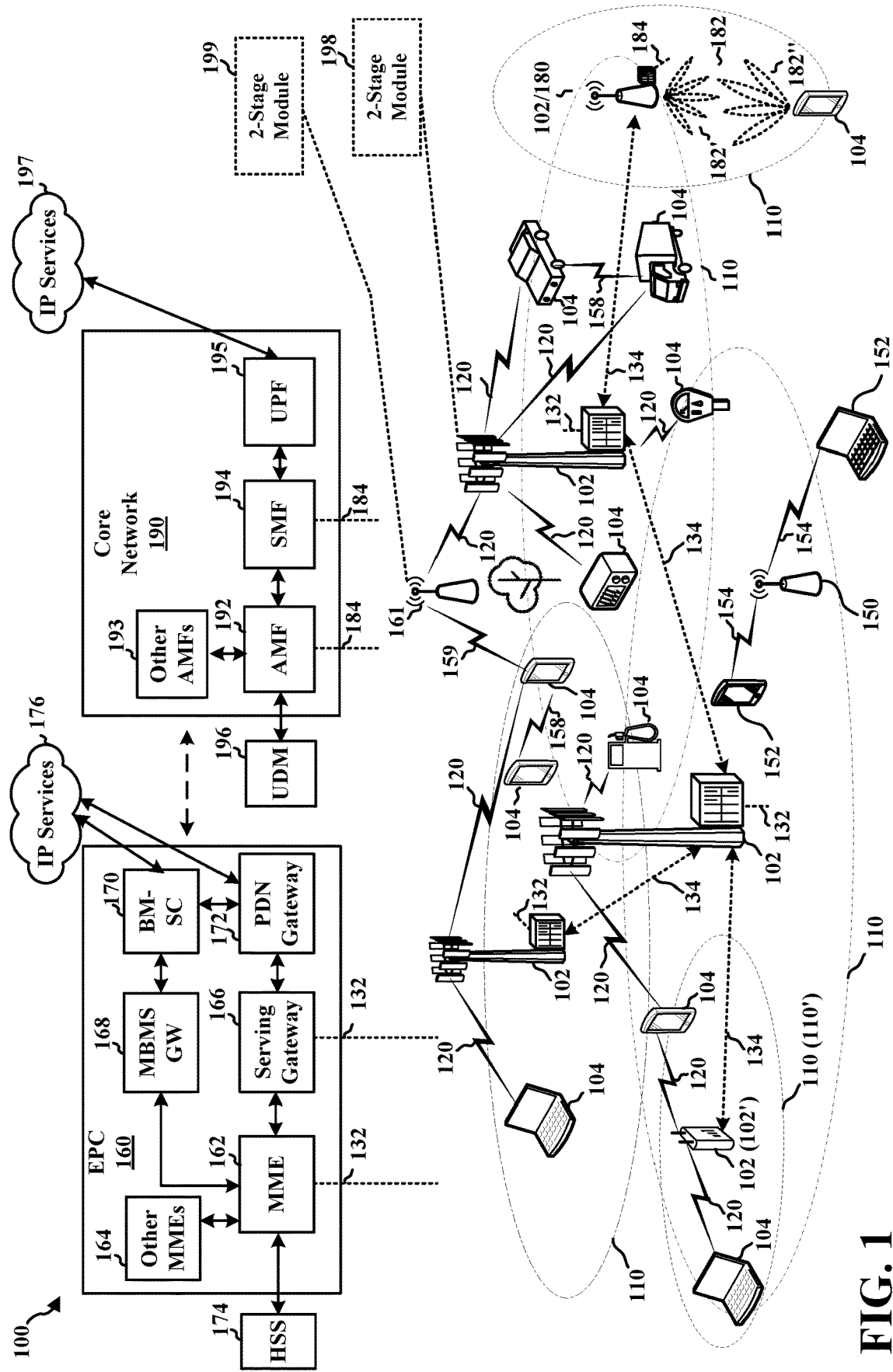
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Base stations and user equipment (UEs) in a wireless communications system may use beamforming techniques to communicate with each other by using spatial dimensions provided by an environment. However, in some cases, physical proximity or environmental factors (e.g., interference, blockage) may impair beamforming communications between the base stations the UEs. In some examples, the wireless communications system may employ a reconfigurable intelligent surface (RIS) that uses passive or nearly passive components to redirect (e.g., reflect, refract) incoming signals in one or more directions without utilizing a significant power overhead. For example, the RIS may use configurable materials to redirect a signal in a specific direction (e.g., instead of using a power amplifier to amplify and re-transmit the signal). As such, the RIS may increase cell coverage, spatial diversity, and beamforming gain, and may result in the base stations or UEs consuming less power.

Due to the RIS being an intermediate device, there are at least two channels of communication between a base station and a UE that utilize the RIS: a channel between the base station and the RIS, and a channel between the RIS and the UE. As such, there can be varying propagation conditions on either end that can negatively affect the quality of communication between the base station and UE. For example, the changing propagation conditions (e.g., UE's mobility, changing network topology, new devices being added to the communication network and thereby new interference requirements, etc.), may require the network or base station to compute a new suitable RIS reflection pattern. However, the time needed to compute the new RIS pattern and send the updated pattern to the RIS controller (e.g., over a control channel between the base station and the RIS controller) may introduce latency ad reduced reliability to communications between the base station and UEs especially under rapidly varying propagation conditions.

Specifically, determination of a suitable RIS pattern at the base station or network may require significant computation. This is because finding a good configuration that maintains a main-lobe gain towards the desired UE(s) (which may be in motion) and/or has reduced sidelobe gain to comply with new interference requirements from other wireless devices, may require frequent reconfiguration and/or lengthy computations. In addition, frequently sending the new RIS pattern over the control channel also increases communication overhead, which could scale up with an increasing number of controllable RIS elements (e.g., sub-grouped unit-cells) and wireless devices. Moreover, utilizing a single large codebook that offers sufficiently many configuration choices which trade-off main-lobe gain with sidelobe suppression can lead to unacceptable increase in latency as well as memory overhead.

Accordingly, aspects of the disclosure are directed to a two-stage codebook design for RIS reconfiguration to support a lower latency, lower memory solution having an index-based configuration indication over control channels as a complementary solution to reduce the communication overhead.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

Figure 4:
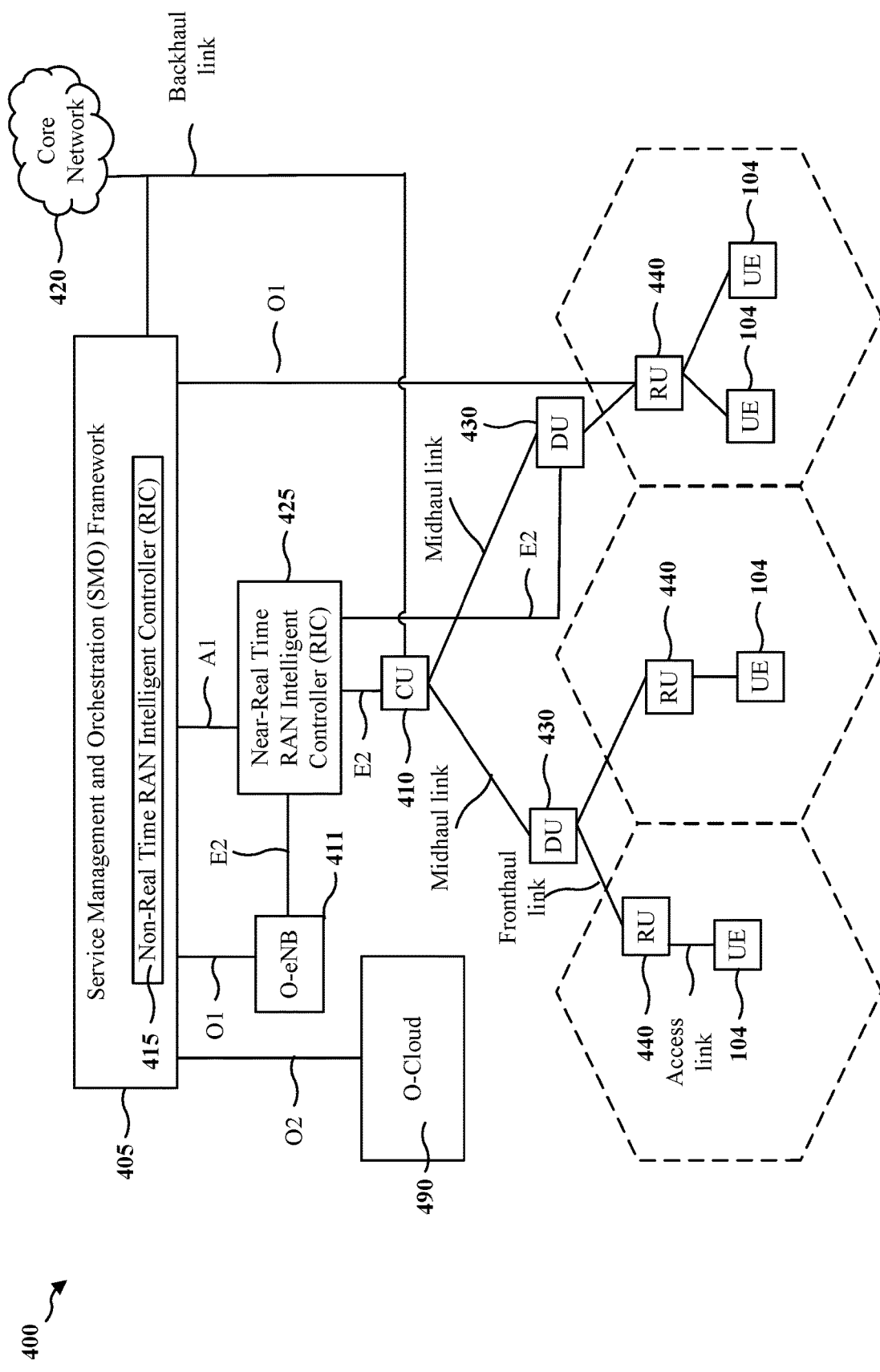
FIG. 4 is a block diagram illustrating an example disaggregated base station architecture.

Base stations 120/180 and UEs 104 in a wireless communications system may use beamforming techniques to communicate with each other by using spatial dimensions provided by an environment. However, in some cases, physical proximity or environmental factors (e.g., interference, blockage) may impair beamforming communications between a network node (e.g., a base station 102/180 or a portion of a disaggregated base station such as a distributed unit (DU) or a radio unit (RU), as illustrated in FIG. 4) and a UE 104. In some examples, the access network 100 may include repeater stations (e.g., repeater 161), also referred to as relays, reconfigurable intelligent surfaces (RISs), network-controlled repeaters (NCRs), and the like. A repeater 161 such as a RIS uses passive or nearly passive components to redirect (e.g., reflect, refract) an incoming signal of a communication link 120 in one or more directions without utilizing a significant power overhead. For example, the RIS may use configurable materials to transmit a redirected signal 159 in a specific direction (e.g., instead of using a power amplifier to amplify and re-transmit the signal). As such, the RIS may increase cell coverage, spatial diversity, and beamforming gain, and may result in network nodes and/or UEs consuming less power.

In some aspects, the RIS may be dynamically configured to redirect an incoming signal in a specific direction. For example, a network node or a UE 104 may configure the RIS to redirect a beamformed communication in a direction of an intended receiver. That is, RISs can facilitate transmission between the network node and a UE or between two UEs for sidelink communications.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QoS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the network node 102/180 may be configured with a 2-stage module 198 configured to: obtain, from a network node, a first codeword indicating a first incident direction of a first beam and a first reflected direction of a second beam, the first codeword being one of at least one codeword of a stage-1 codebook; obtain, from the network node, a second codeword of a stage-2 codebook, the stage-2 codebook being associated with the first codeword, the second codeword indicating a parameter of the second beam; and update the second beam according to the parameter indicated by the second codeword.

Referring again to FIG. 1, in certain aspects, the RIS 161 may be configured with a 2-stage module 199. In some examples, the 2-stage module 199 may be configured to: output, for transmission to a device, a first codeword indicating a first incident direction of a first beam and a first reflected direction a second beam, the first codeword being one of at least one codeword of a stage-1 codebook; and output, for transmission to the device, a second codeword of a stage-2 codebook, the stage-2 codebook being associated with the first codeword, the second codeword indicating a parameter of the second beam.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu * 15$ kilohertz (kHz), where μ is the numerology 0 to 4.

As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
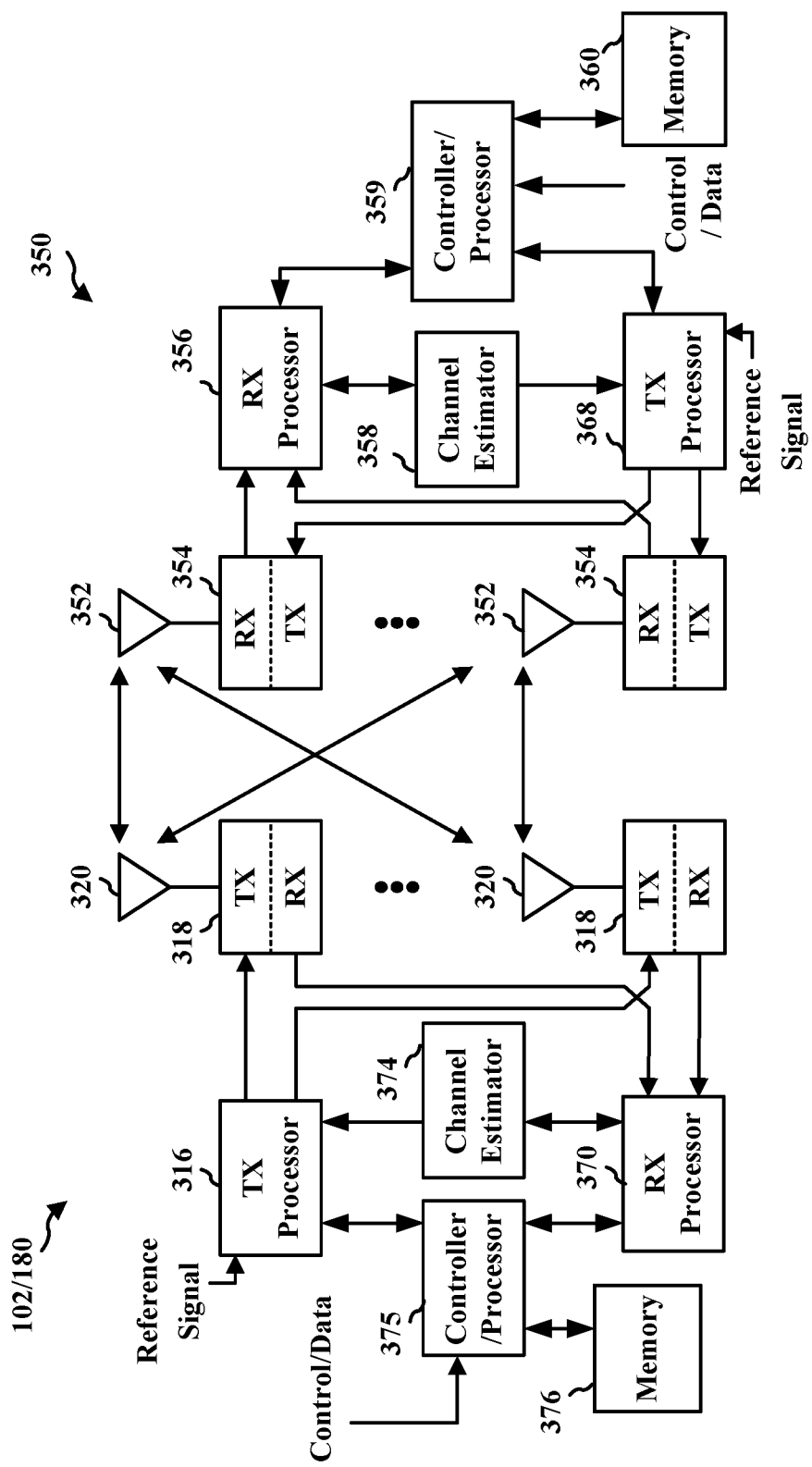
FIG. 3 is a diagram illustrating an example of a base station and user equipment (UE) in an access network.

FIG. 3 is a block diagram of a base station 102/180 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing.

The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In some examples, FIG. 3 illustrates a base station 102/180 and also a reconfigurable intelligent surface (RIS) 350 (e.g., RIS 161 of FIG. 1). In this case, the RIS 350 may use its signal processing hardware to receive and decode control signals transmitted by the base station 102/180. The control signals may configure the RIS 350 to receive and reflect other signals in different incident and reflective directions. It should be noted that these signals are not signals that the RIS 350 reflects to another wireless device. For example, the RIS 350 may not have a signal processing capability for signals that are transmitted to the RIS to be reflected in a particular direction.

FIG. 4 is a block diagram illustrating an example disaggregated base station 400 architecture. The disaggregated base station 400 architecture may include one or more network nodes, including centralized units (CUs) 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with other network nodes such as one or more DUs 430 via respective midhaul links, such as an F1 interface. The DUs 430 may communicate with other network nodes such as one or more RUs 440 via respective fronthaul links. The RUs 440 may communicate with respective UEs 104 via one or more radio frequency (RF) access links. In some implementations, the UE 104 may be simultaneously served by multiple RUs 440.

Each of the network nodes, e.g., the CUs 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an A1 interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via O1) or via creation of RAN management policies (such as A1 policies).

At least one of the TX processor 368, the RX processor 356, and the controller/processor 359 may be configured to perform aspects in connection with the 2-stage module 198 of FIG. 1.

At least one of the TX processor 316, the RX processor 370, and the controller/processor 375 may be configured to perform aspects in connection with 2-stage module 199 of FIG. 1.

Examples of Two-Stage Codebook Communications

Figure 5:
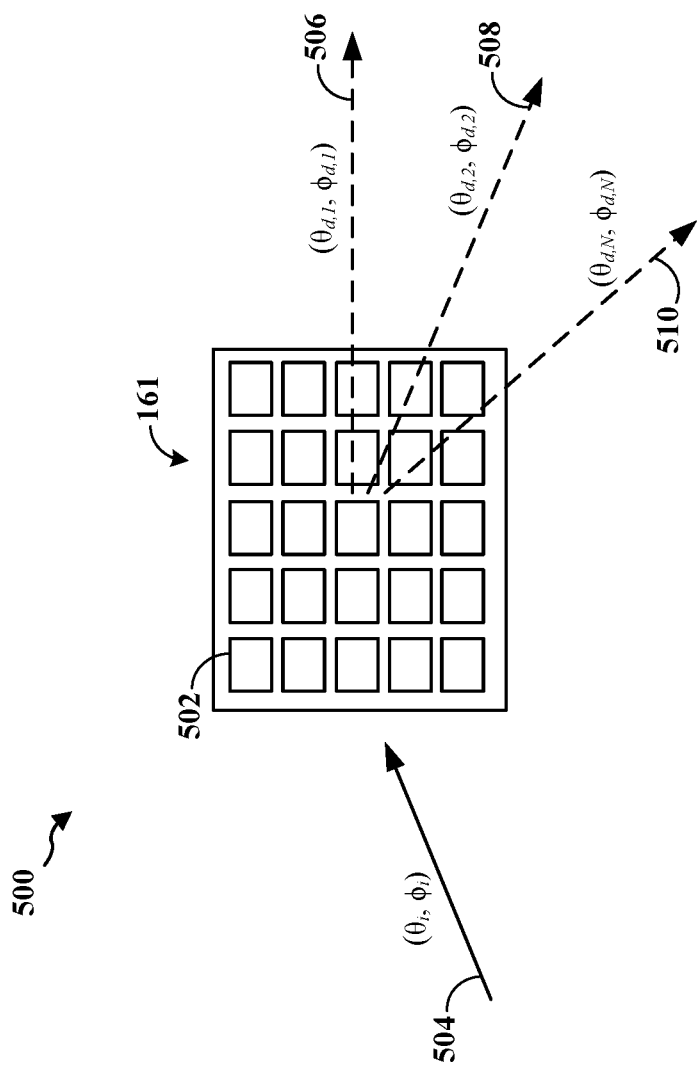
FIG. 5 is a block diagram conceptually illustrating a reconfigurable intelligent surface (RIS) receiving an incident transmission.

FIG. 5 is a block diagram conceptually illustrating a RIS 161 receiving an incident transmission 504 from a first directed beam and transmitting a reflected transmission 506/508/510 in three directions.

Figure 6:
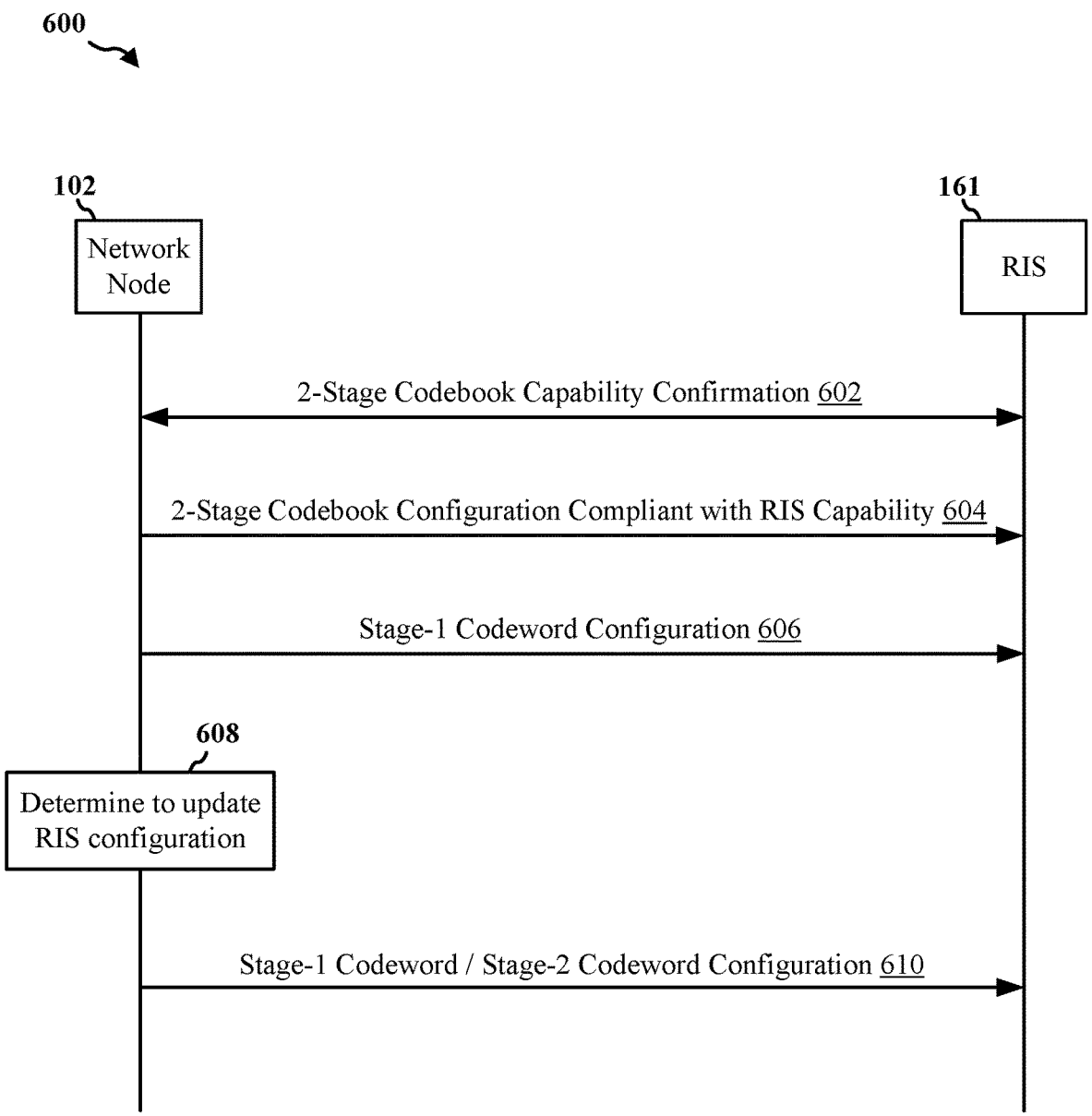
FIG. 6 is a call-flow diagram illustrating example communications between a network node and a RIS.

As shown in the example of FIG. 6, the incident transmission 504 may include signal that reflects off RIS 161. The RIS 161 may reflect the incident transmission 504 via one or more of a first reflected transmission 506, a second reflected transmission 508, and a third reflected transmission 510 towards one or more UEs. A beam direction of the incident transmission 504 is defined by angular coordinates (e.g., azimuth and elevation angular coordinates) ($\theta_i$, $\phi_i$), and a beam direction of each of the reflected transmissions are similarly defined: ($\theta_{d,1}$, $\phi_{d,1}$) for the first reflected transmission 506, ($\theta_{d,2}$, $\phi_{d,2}$) for the second reflected transmission 508, and ($\theta_{d,N}$, $\phi_{d,N}$) for the third reflected transmission 510.

According to example aspects of the present disclosure, the network node may control the RIS 161 for downlink (DL) and uplink (UL) communications with a UE. For example, the RIS may receive a control signal from another node (e.g., the network node or the UE) and adjust a beam direction the one or more reflected transmissions based at least in part on the control signal.

In certain aspects, the network node may configure the RIS 161 with a stage-1 codebook and at least one stage-2 codebook. The stage-1 codebook may include one or more codewords, wherein each codeword includes angular coordinates for an incident transmission and a corresponding reflected transmission. Thus, for example, a first codeword of a stage-1 codebook may include both: ($\theta$, $\phi$) and ($\theta$, $\phi$), corresponding to the illustrated incident transmission 504 and the first reflected transmission 506. Each codeword in the stage-1 codebook is a therefore a RIS configuration or pattern associated with a particular incident transmission direction and a particular reflection transmission direction. It should be noted that the stage-1 codebook may include a plurality of codewords. Thus, a first stage-1 codeword may include both ($\theta_i$, $\phi_i$) and ($\theta_{d,1}$, $\phi_{d,1}$), a second stage-1 codeword may include both ($\theta_i$, $\phi_i$) and ($\theta_{d,2}$, $\phi_{d,2}$), and an Nth stage-1 codeword may include ($\theta_i$, $\phi_i$) and ($\theta_{d,N}$, $\phi_{d,N}$). Each of the first, second, and Nth stage-1 codewords may form part of the same stage-1 codebook.

Each codeword of the stage-1 codebook may be associated with a corresponding stage-2 codebook. Each codeword in a stage-2 codebook may indicate a variation in the reflected beam. For example, the variation may include a variation in a direction of the reflected beam (e.g., a slight directional change from ($\theta_{d,1}$, $\phi_{d,1}$)), a sidelobe characteristic of the reflected beam, and/or a diameter or width of the second beam. Thus, each codeword of the stage-2 codebook corresponds to a direction pair defined by a codeword of the stage-1 codebook. Accordingly, each codeword in the stage-2 codebook may be configured to provide adequate gain for the incident transmission and the reflected transmission indicated by the stage-1 codeword.

Each codeword of the stage-1 codebook may include a corresponding index. This way, when the network node transmits an indication of a codeword from the stage-1 codebook to the RIS, the transmission may simply include a particular integer or other alphanumeric value that maps to the intended codeword. For example, after the network node provides the stage-1 and stage-2 codebooks to the RIS 161, the network node may inform the RIS 161 of an incident transmission direction and a reflected transmission direction to be used for future communications with one or more UEs by transmitting an index of the stage-1 codeword to the RIS 161.

FIG. 6 is a call-flow diagram illustrating example communications between a network node 102 and a RIS 161. The communications illustrated may be performed via a control channel established between the network node 102 and the RIS 161.

At a first communication 602, the network node 102 may transmit a signal to the RIS 161 inquiring whether the RIS 161 is configured with a 2-stage codebook capability. If the RIS 161 responds with an indication that it has the 2-stage codebook capability, then network node 102 may move onto the second communication 604. In some examples, the RIS 161 may provide the network node 102 with information indicative of the RISs memory capacity. The network node 102 may provide the RIS 161 with a stage-1 codebook and stage-2 codebook that are sized based on the RIS 161 memory capacity.

At a second communication 604, the network node 102 may transmit a 2-stage codebook configuration comprising at least one stage-1 codebook and one stage-2 codebook to the RIS 161. Each codeword of the stage-1 codebook may correspond to a pair of incident and reflected beam directions.

At a third communication 606, the network node 102 may transmit an indication of a stage-1 codeword to the RIS 161. For example, the network node may transmit an index associated with a first codeword of the stage-1 codebook. This indication of the codeword may inform the RIS 161 of an incident beam direction (e.g., ($\theta_i$, $\phi_i$)) and a reflected beam direction (e.g., ($\theta_{d,1}$, $\phi_{d,1}$)) for a data transmission (e.g., PDSCH/PUSCH) between the network node 102 and a UE via the RIS 161. In some examples, the network node 102 may determine the first codeword based on a sweep through the stage-1 codebook. That is, the network node 102 may compute which codeword in the stage-1 codebook would provide a highest quality communication channel between the UE 104 and the network node 102 via the RIS 161.

At a first process 608, the network node 102 may determine to update the RIS configuration. For example, if a first UE with which the network node 102 is communicating via the RIS 161 is moving, the direction of the reflected beam (e.g., ($\theta_{d,1}$, $\phi_{d,1}$) provided via the first codeword) may need to be slightly adjusted to improve the gain of the main lobe of the reflected beam. In such an example, the first UE may provide feedback to the network node 102 indicating an SNR or any other suitable information reflective of the quality of a downlink signal received from the RIS 161 from the perspective of the first UE.

In another example, one or more additional UEs may begin active communications with the network node 102 near the first UE, or a second UE near the first UE may be moving, which may result in the initial direction of the reflected beam being a source of interference for the additional/second UE(s). In yet another example, the network node 102 may receive an indication from another network node (e.g., a CU/DU) that the initial direction of the reflected beam is a source of interference for the additional/second UE(s).

Based on the UE feedback and/or network feedback, the network node 102 may determine whether to update the first codeword of the stage-1 codebook to a second codeword, or whether to maintain the first codeword and adjust the incident and/or reflected beam(s) using a codeword from the stage-2 codebook. Examples provided in the figures below provide additional detail for this process.

At a fourth communication 610, the network node 102 may transmit an indication of the updated stage-1 codeword or an indication of a stage-2 codeword to the RIS 161 based on the determination at the first process 608.

Figure 7A:
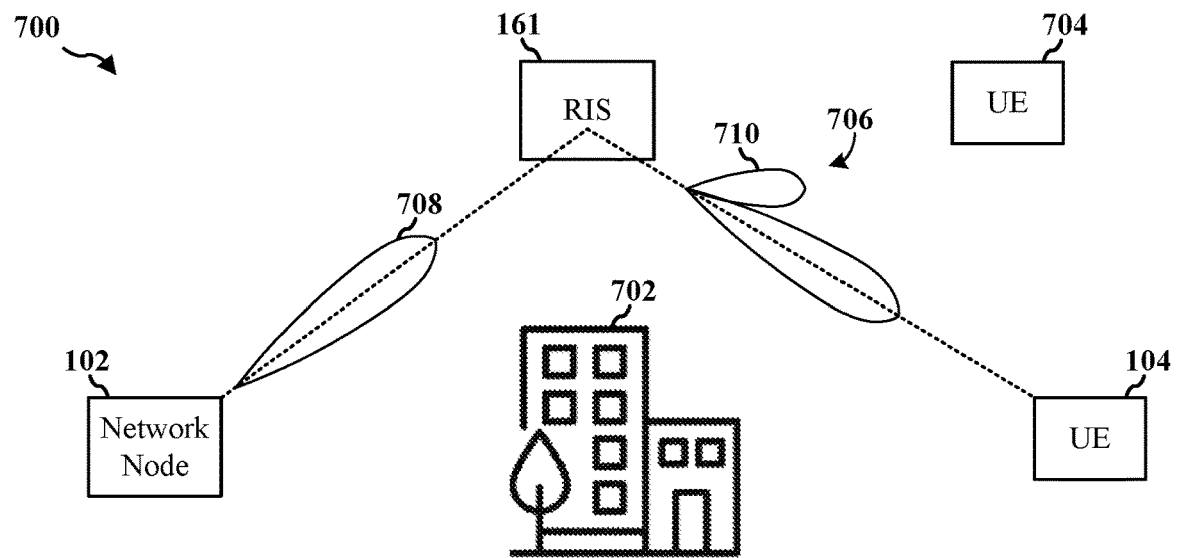
FIGS. 7A and 7B are block diagrams illustrating examples of a two-stage reconfiguration of a RIS reflected beam.
Figure 7B:
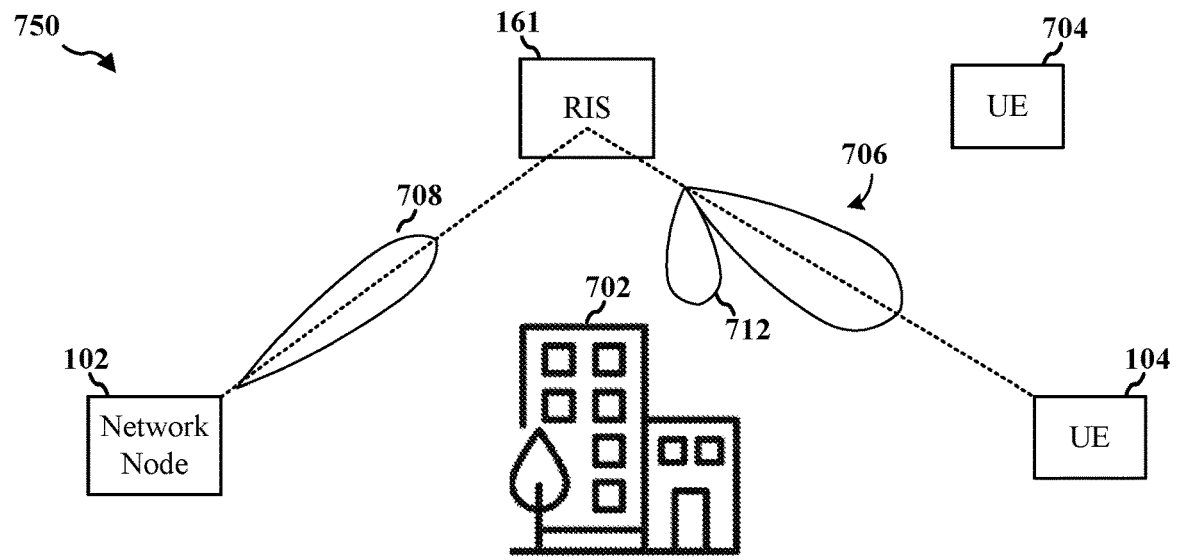

FIGS. 7A and 7B are block diagrams illustrating examples of a two-stage reconfiguration of a RIS 161 reflected beam. These examples illustrate a scenario where a first reflected beam 706 transmitted by the RIS 161 to an intended first UE 104 causes interference with a second UE 704.

Initially, the network node 102 may provide the RIS 161 with a two-stage codebook compliant with RIS capability (e.g., as illustrated in the first communication 602 of FIG. 6) via a control channel (e.g., PDCCH). The network node 102 may then transmit (e.g., also via the control channel) an indication of a stage-1 codeword from the stage-1 codebook to the RIS 161 to establish an incident beam direction 708 and the first reflected beam direction 706 to provide a communication link between the network node 102 and a first UE 104 via the RIS 161. Here, an obstruction 702 (e.g., a structure) between the network node 102 and the first UE 104 may necessitate the use of the RIS 161 for communication between the network node and the first UE.

The reflected beam is characterized by a first sidelobe 710 that may interfere with communications from the perspective of a second UE 704. The second UE 704 may transmit a notification of the interference to the network node 102, or the network node 102 may receive interference notification from another network node (e.g., CU/DU). Thus, the network node 102 may determine (e.g., as illustrated in the first process 608 of FIG. 6) to update the RIS configuration (e.g., the pattern of one or more of the incident beam and the reflected beam) to reduce or eliminate interference experienced by the second UE 704.

In this example, because the incident beam direction 708 is not the cause of interference, the network node 102 may determine to adjust a beam characteristic of the reflected beam. Thus, the network node 102 may transmit an indication (e.g., an index) of a stage-2 codeword from a stage-2 codebook associated with the stage-1 codeword. Here, the stage-2 codeword may update the reflected beam such that the RIS 161 transmits a reflected beam having a main lobe pointed in the same direction shown in FIG. 7A, but with the first side lobe 710 directed to the second UE being eliminated or reduced in power.

Accordingly, as illustrated in FIG. 7B, a reflected pattern may be updated at the RIS 161 such the first reflected beam direction 706 is the same as initially configured by the stage-1 codeword but characterized by a second side lobe 712 directed away from the second UE 704, thereby eliminating or reducing the interference experienced by the second UE 704.

The same result may occur if the first UE 104 has moved and the reflected beam is no longer adequate for communication between the network node 102 and the UE 104. For example, if the first UE 104 moves and the first reflected beam direction 706 no longer provides the first UE 104 with adequate signal quality, the first UE 104 may transmit feedback (e.g., SNR) to the network node 102 indicating the loss in signal quality. In this example, the network node may determine to update the RIS configuration by transmitting a stage-2 codeword to the RIS 161. The stage-2 codeword may adjust the first reflected beam direction 706 slightly to provide the first UE 104 with a reflected signal having higher gain. In this example, the network node 102 is not required to transmit an all-new incident beam direction and reflected beam direction to the RIS 161. Instead, the stage-2 codeword is part of a stage-2 codebook associated with the stage-1 codeword used to initially configure the RIS 161. As such, latency associated with determining a new incident and reflected beam direction is reduced, and signaling overhead is minimized.

Figure 8A:
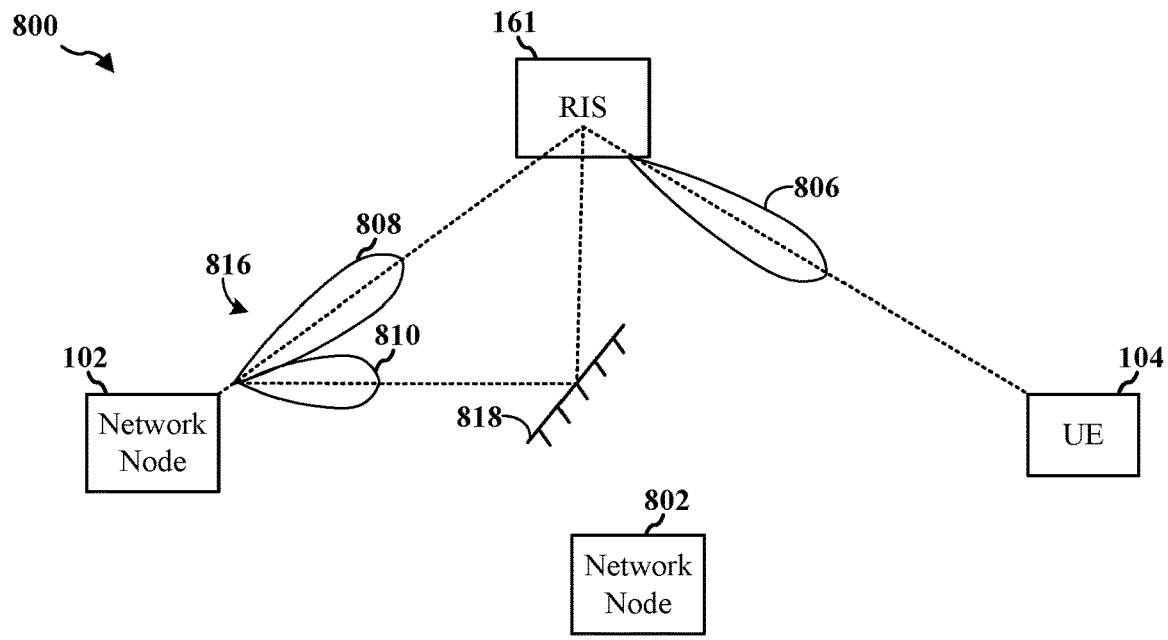
FIGS. 8A and 8B are block diagrams illustrating examples of a two-stage reconfiguration of a RIS reflected beam.
Figure 8B:
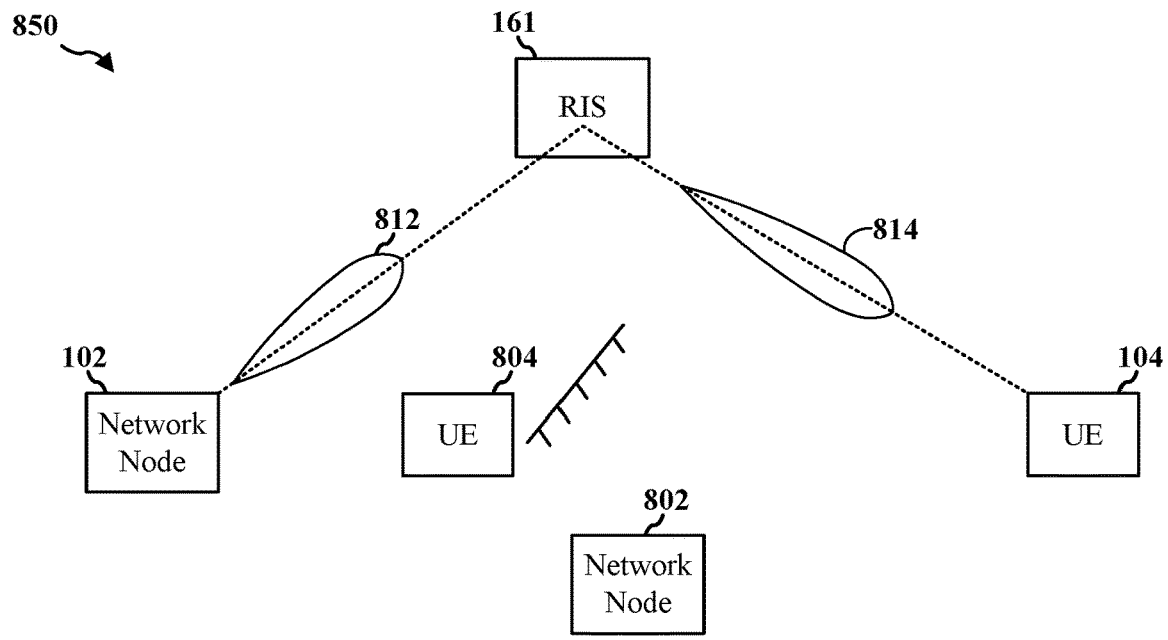

FIGS. 8A and 8B are block diagrams illustrating examples of a two-stage reconfiguration of an incident beam transmitted by a network node 102. These examples illustrate a scenario where a side lobe 810 of first incident beam 816 transmitted by the network node 102 to the RIS 161 causes interference with a second UE 804.

As illustrated in FIG. 8A, the network node 102 may configure the RIS 161 with a first stage-1 codebook indicating a direction of a first incident beam 816 and a direction of a first reflected beam 806. Here, the first incident beam 816 is characterized by a main lobe 808 and a side lobe 810. The main lobe 808 is directed to the RIS 161, while the side lobe 810 is directed to a passive reflector 818 that directs the side lobe 810 signaling to the RIS 161. In this example, the first stage-1 codeword may define the direction of both the main lobe 808 and the side lobe 810. Accordingly, the first reflected beam 806 may be a sum of the energy of main lobe and side lobe directed to the first UE 104.

FIG. 8B illustrates a scenario where a second UE 804 begins communicating with a second network node 802. The location of the second UE 804 may cause the second UE 804 to experience interference from the side lobe 810 transmitted from the network node 102. Thus, the second network node 802 may transmit a notification to the network node 102 indicating that the side lobe 810 is causing interference at the second UE 804.

In response to the notification, the network node 102 may determine to update the RIS configuration with a new incident beam and/or reflected beam pattern. In this example, the network node 102 may determine to update its incident beam pattern by transmitting a stage-2 codeword to the RIS 161 and changing the first incident beam 816 to a second incident beam 812. The second incident beam 812 may have the same direction as the main lobe 808 of the first incident beam 816, but without the side lobe 810. For example, the second incident beam 812 may be configured such that it does not have a sidelobe, or any associated sidelobe is insignificant in terms of interference experienced at the second UE 804.

As a result of the change to the second incident beam, the RIS 161 may also change the first reflected beam 806 to a second reflected beam 814, although it should be noted that the reflected beam may not experience any change in this example.

Thus, according to aspects of the disclosure, the network node may initially select a RIS configuration from a stage-1 codebook known to both the RIS 161 and the network node 102. The stage-1 codebook may include a set of codewords, (e.g., RIS configurations/patterns). Each codeword may correspond to a pair of incident and reflected directions such that the gain at the reflected direction for that incident direction is maximized.

A RIS configuration used by the network node 102 and the RIS 161 to enable communication between a UE 104 and the network node may need to be updated at a future time. In one example, the UE 104 may be moving, which may reduce the gain of reflected signal as perceived by that UE 104. In another example, the network topology may change due to newly active or existing UEs or other wireless devices in motion resulting in an initial RIS configuration causing unacceptable interference to them. In yet another example, the network node 102 may change its incident beam direction and/or characteristics to accommodate new interference constraints indicated by another network node, thereby resulting in a change of an incident direction of a signal transmitted to the RIS.

Conditions that trigger the network node 102 to update the RIS configuration may include feedback received from the UE 104 indicating that the main lobe gain from the RIS 161 is not enough. For example, the network node 102 may receive SNR feedback from the UE 104. If the SNR feedback drops below a threshold value, the network node 102 may respond by updating the direction and/or characteristics of the reflected beam using a stage-2 codeword.

Another triggering condition may include an indication of a "protected direction," along which signaling should be limited. Here, the network node may periodically transmit a query to the network (e.g., if the network node is an RU and the network is a CU/DU). The network may respond to the network node 102 indicating the that a particular direction is protected. If the current incident beam and/or reflected beam are directed to the protected area, the network node may update one or more of the stage-1 codeword and stage-2 codeword.

In yet another triggering example, the network node 102 may periodically direct the RIS 161 to sweep across multiple RIS configurations using two or more stage-2 codewords of a stage-2 codebook for a given stage-1 codeword. The RIS 161 may provide the network node 102 with an interference report that allows the network node 102 to evaluate the scenario and determine an appropriate stage-1 or stage-2 codeword to address interference.

Accordingly, the network node 102 may reconfigure the RIS 161 using a codeword selected from either a stage-1 codebook or a stage-2 codebook. The stage-1 codebook includes RIS 161 configurations (e.g., codewords) each with different reflected beam main lobe peak directions associated with different incident beam directions. The network node 102 may transmit an updated stage-1 codeword to the RIS 161 to change the reflected and incident beam directions. Because the codeword may be changed by transmitting an index mapped to the codeword, the signaling overhead is reduced.

Each Stage-2 codebook may include multiple codewords, all of which are associated with (e.g., are a companion of) a stage-1 codeword. Each stage-2 codeword may be used to implement a slight adjustment to existing reflected and incident beam directions associated with a stage-1 codeword (e.g., less of a change to a beam direction and/or beam characteristic than an updated stage-1 codeword).

In certain aspects, a one or more codewords from a stage-2 codebook may function to lower the sidelobe gain of an incident or reflected beam associated with a stage-1 codeword. As illustrated in FIGS. 7A, 7B, 8A, and 8B, such an adjustment may reduce interference experienced by other UEs while maintaining suitable main lobe gain directed to an intended UE. Alternatively, one or more stage-2 codewords may be configured to adjustment a direction of one or more of the reflected and incident beam directions for UEs whose directions could have slightly changed (e.g., if a UE 104 has not moved enough to require a change of a currently implemented stage-1 codeword).

In some examples, a number of codewords in a stage-2 codebook may be less than a total number of possible codewords for a stage-1 codeword. Reducing a number of stage-2 codewords may reduce computational and memory resources required to implement a 2-stage codebook. The network node 102 may indicate a particular codeword (e.g., from stage-1 and stage-2 codebooks) to the RIS 161 by transmitting an index value associated with the codeword, and/or a codebook type (e.g., stage-1 or stage-2), thereby minimizing communication overhead.

Figure 9:
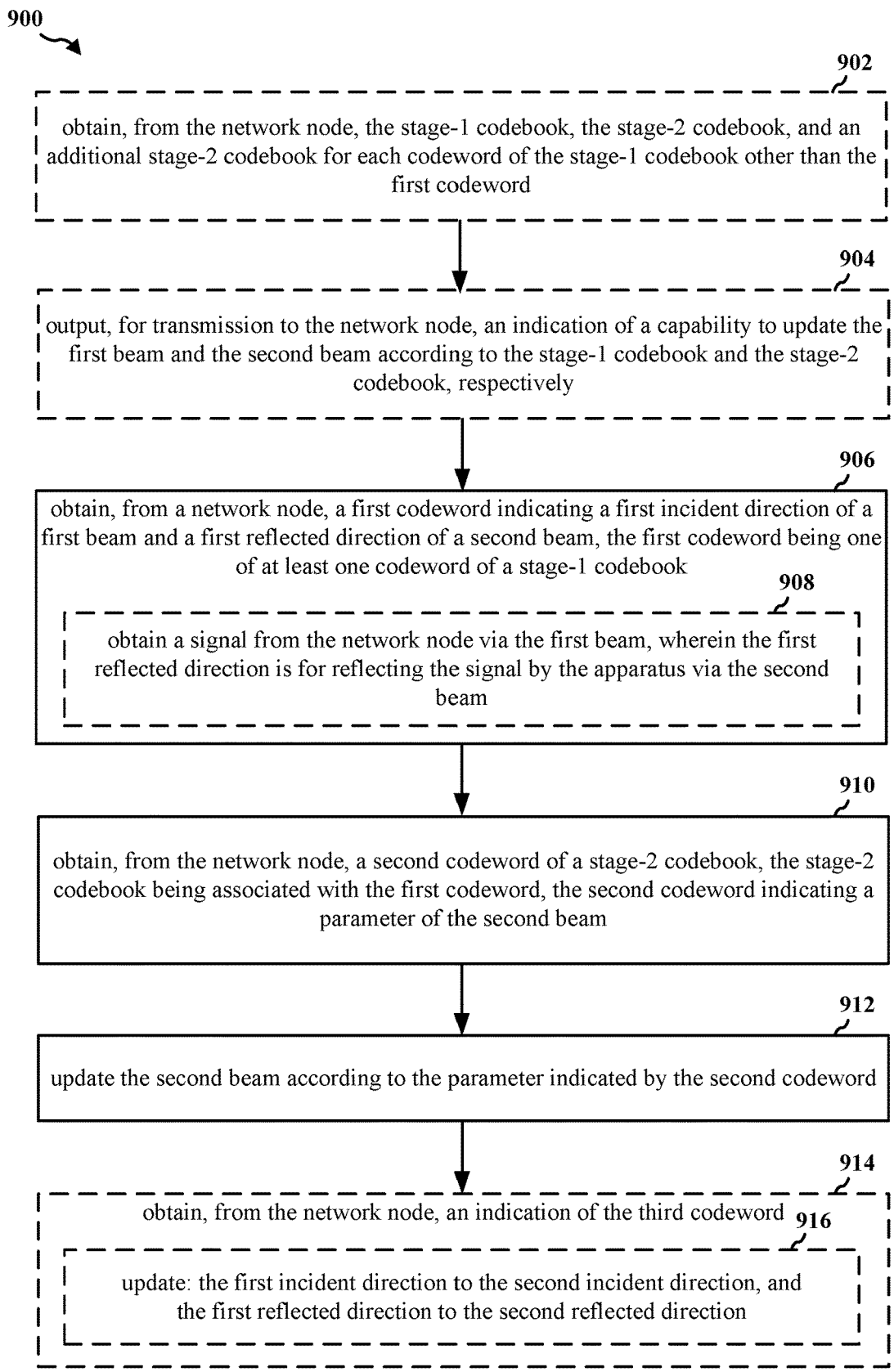
FIG. 9 is a flowchart of a method of wireless communication.

FIG. 9 is a flowchart 900 of a method of wireless communication. The method may be performed by a repeater or a relay, such as a reconfigurable intelligent surface (RIS). For example, the RIS 161/350 of FIGS. 1, 3, and 5-8; the apparatus 1002). At 902, the RIS may optionally obtain, from the network node, the stage-1 codebook, the stage-2 codebook, and an additional stage-2 codebook for each codeword of the stage-1 codebook other than the first codeword. For example, 902 may be performed by an obtaining component 1040 of FIG. 10. Each stage-2 codebook corresponds to individual stage-1 codewords.

At 904, the RIS may optionally output, for transmission to the network node, an indication of a capability to update the first beam and the second beam according to the stage-1 codebook and the stage-2 codebook, respectively. For example, 904 may be performed by an outputting component 1042. Here, the RIS may notify the network node that it has a two-stage codebook capability for directing/shaping beams for transmitting a reflected signal. The indication of the RIS's capability may be transmitted by a RIS controller to the network node.

At 906, the RIS may obtain, from a network node, a first codeword indicating a first incident direction of a first beam and a first reflected direction of a second beam, the first codeword being one of at least one codeword of a stage-1 codebook. For example, 906 may be performed by an obtaining component 1040 of FIG. 10.

At 908, the RIS may optionally obtain a signal from the network node via the first beam, wherein the first reflected direction is for reflecting the signal by the apparatus via the second beam. For example, 908 may be performed by an obtaining component 1040 of FIG. 10.

At 910, the RIS may obtain, from the network node, a second codeword of a stage-2 codebook, the stage-2 codebook being associated with the first codeword, the second codeword indicating a parameter of the second beam. For example, 910 may be performed by an obtaining component 1040 of FIG. 10.

At 912, the RIS may update the second beam according to the parameter indicated by the second codeword. For example, 912 may be performed by an updating component 1044 of FIG. 10. Here, the RIS may update a reflected beam characteristic based on a change of a stage-1 codebook codeword, or a stage-2 codebook codeword.

At 914, the RIS may optionally obtain, from the network node, an indication of the third codeword. For example, 910 may be performed by an obtaining component 1040 of FIG. 10. Here, the stage-1 codebook includes a third codeword indicating a second incident direction of the first beam and a second reflected direction of the second beam.

At 916, the RIS may optionally update: the first incident direction to the second incident direction, and the first reflected direction to the second reflected direction. For example, 912 may be performed by an updating component 1044 of FIG. 10. Here, the RIS may update an incident direction and/or a reflected direction based on a codeword change.

In certain aspects, the first codeword further indicates angular coordinates of the first incident direction of the first beam.

In certain aspects, the parameter of the second beam comprises one or more of a sidelobe characteristic of the second beam, a width of the second beam, a gain of the second beam, or a variation of the first reflected direction of the second beam.

Figure 10:
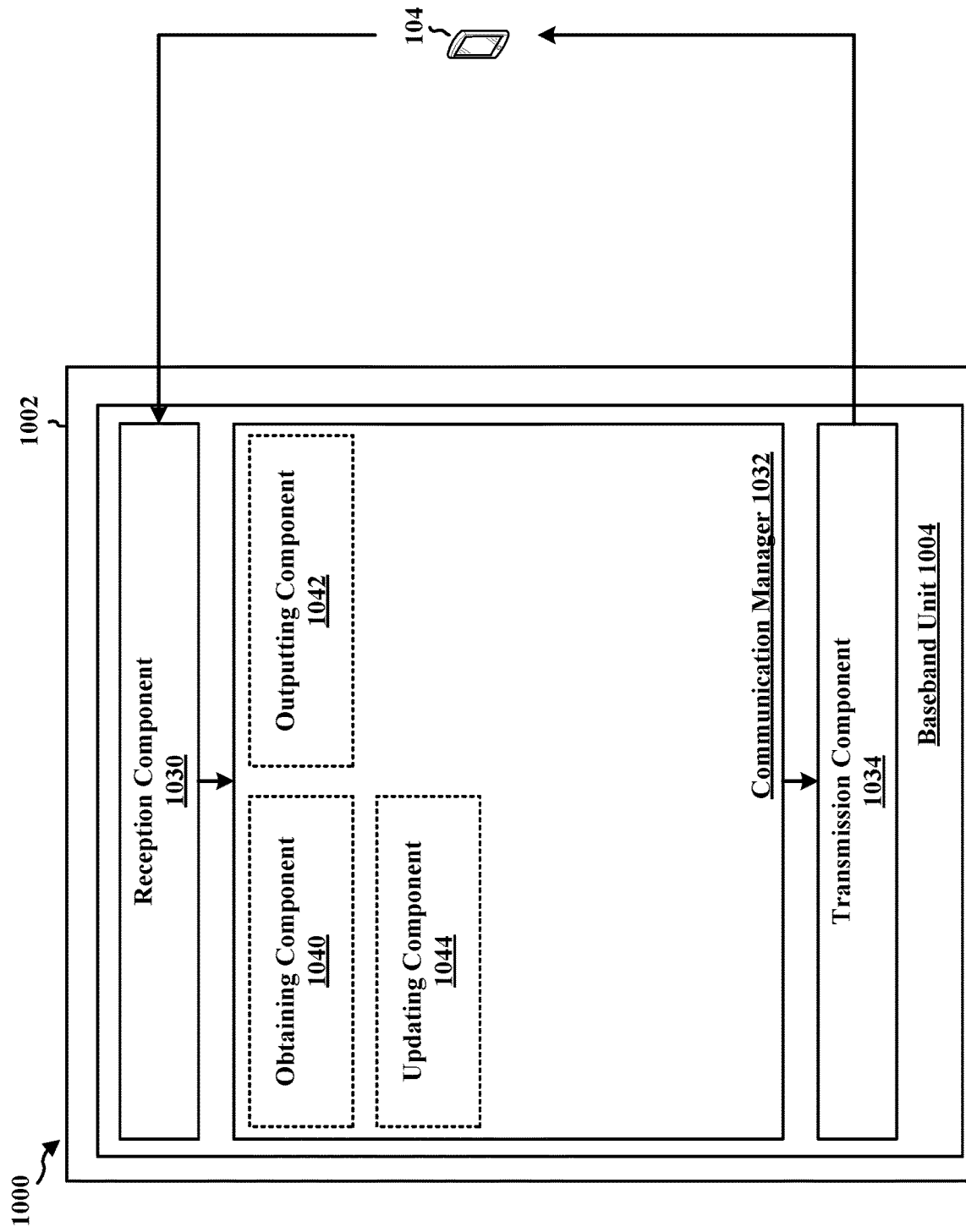
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes an obtaining component 1040 that is configured to obtain, from the network node, the stage-1 codebook, the stage-2 codebook, and an additional stage-2 codebook for each codeword of the stage-1 codebook other than the first codeword; obtain, from a network node, a first codeword indicating a first incident direction of a first beam and a first reflected direction of a second beam, the first codeword being one of at least one codeword of a stage-1 codebook; obtain a signal from the network node via the first beam, wherein the first reflected direction is for reflecting the signal by the apparatus via the second beam; obtain, from the network node, a second codeword of a stage-2 codebook, the stage-2 codebook being associated with the first codeword, the second codeword indicating a parameter of the second beam; and obtain, from the network node, an indication of the third codeword; e.g., as described in connection with 902, 906, 908, 910, 914 of FIG. 9.

The communication manager 1032 further includes an outputting component 1042 configured to output, for transmission to the network node, an indication of a capability to update the first beam and the second beam according to the stage-1 codebook and the stage-2 codebook, respectively; e.g., as described in connection with 904 of FIG. 9.

The communication manager 1032 further includes an updating component 1044 configured to update the second beam according to the parameter indicated by the second codeword; update: the first incident direction to the second incident direction, and the first reflected direction to the second reflected direction; e.g., as described in connection with 912 and 916 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for obtaining, from the network node, the stage-1 codebook, the stage-2 codebook, and an additional stage-2 codebook for each codeword of the stage-1 codebook other than the first codeword; means for outputting, for transmission to the network node, an indication of a capability to update the first beam and the second beam according to the stage-1 codebook and the stage-2 codebook, respectively; obtaining, from a network node, a first codeword indicating a first incident direction of a first beam and a first reflected direction of a second beam, the first codeword being one of at least one codeword of a stage-1 codebook; means for obtaining a signal from the network node via the first beam, wherein the first reflected direction is for reflecting the signal by the apparatus via the second beam; means for obtaining, from the network node, a second codeword of a stage-2 codebook, the stage-2 codebook being associated with the first codeword, the second codeword indicating a parameter of the second beam; means for updating the second beam according to the parameter indicated by the second codeword; means for obtaining, from the network node, an indication of the third codeword; and means for updating: the first incident direction to the second incident direction, and the first reflected direction to the second reflected direction.

The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
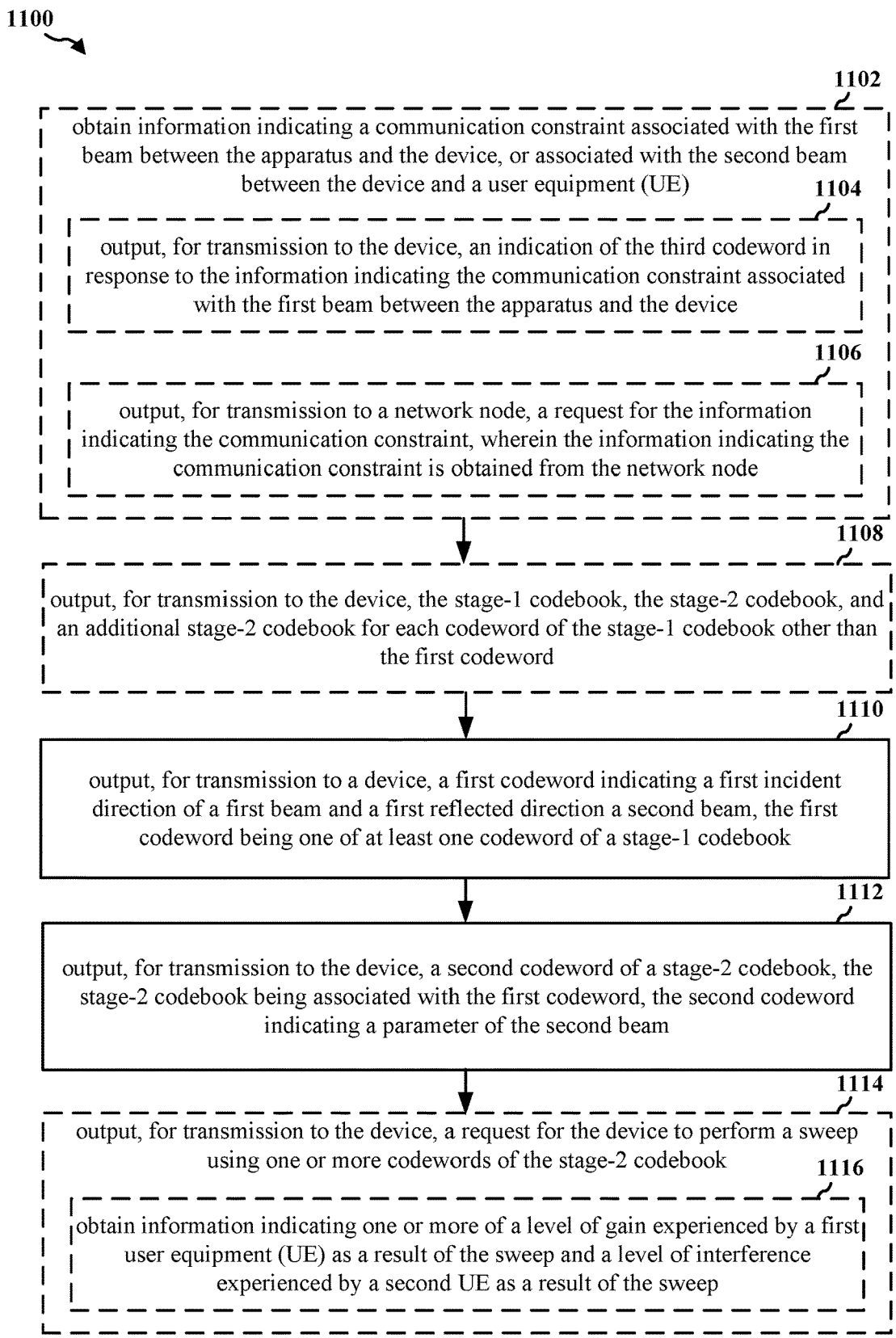
FIG. 11 is a flowchart of a method of wireless communication.

FIG. 11 is a flowchart 1100 of a method of wireless communication. The method may be performed by a base station (e.g., the network node/base station 102/180; the apparatus 1202. At 1102, the network node may optionally, obtain information indicating a communication constraint associated with the first beam between the apparatus and the device, or associated with the second beam between the device and a user equipment (UE). For example, 1102 may be performed by an obtaining component 1240. Here, the network node may receive information indicating a communication constraint, such as interference or potential interference caused by the incident beam or the reflected beam, pathloss, or any other communication constraint such as those illustrated in FIGS. 7A, 7B, 8A, and 8B. Such an indication may come from the network (e.g., CU/DU, or a UE that communicates with the network node via the RIS). Such an indication may trigger the network node to update one or more of a codeword from the stage-1 codebook, or a codeword from the stage-2 codebook.

At 1104, the network node may optionally output, for transmission to the device, an indication of the third codeword in response to the information indicating the communication constraint associated with the first beam between the apparatus and the device. For example, 1104 may be performed by an outputting component 1242. Here, the stage-1 codebook comprises a third codeword indicating a second incident direction of the first beam and a second reflected direction of the second beam. This, in this example, the network node may determine to update the communication via the RIS by updating a stage-1 codebook codeword.

At 1106, the network node may optionally output, for transmission to a network node, a request for the information indicating the communication constraint, wherein the information indicating the communication constraint is obtained from the network node. For example, 1106 may be performed by an outputting component 1242. Here, the network (e.g., CU/DU) may provide the network node with an indication of the communication constraint (e.g., potential interference with another device, loss of communication quality between network node and UE via RIS, etc.) in response to a request by the network node. That is, the network node may periodically transmit a request to the network requesting information about (potential) interference with other devices due to signing at the RIS.

At 1108, the network node may optionally output, for transmission to the device, the stage-1 codebook, the stage-2 codebook, and an additional stage-2 codebook for each codeword of the stage-1 codebook other than the first codeword. For example, 1106 may be performed by an outputting component 1242. Here, the network node may configure the RIS for communication updates via two-stage codebooks.

At 1110, the network node may output, for transmission to a device, a first codeword indicating a first incident direction of a first beam and a first reflected direction a second beam, the first codeword being one of at least one codeword of a stage-1 codebook. For example, 1106 may be performed by an outputting component 1242. Here, the network node may configure the RIS for communication by transmitting a codework from a stage-1 codebook to the RIS.

At 1112, the network node may output, for transmission to the device, a second codeword of a stage-2 codebook, the stage-2 codebook being associated with the first codeword, the second codeword indicating a parameter of the second beam. For example, 1112 may be performed by an outputting component 1242. Here, the network node may transmit a codeword from the stage-2 codebook to the RIS. The stage-2 codebook codeword may be configured to make slight adjustments to the communication configuration indicated by the stage-1 codebook codeword. Each codeword of the stage-1 codebook may be tied to a stage-2 codebook. Thus, each stage-1 codeword may have a dedicated stage-2 codebook.

At 1114, the network node may optionally output, for transmission to the device, a request for the device to perform a sweep using one or more codewords of the stage-2 codebook. For example, 1114 may be performed by an outputting component 1242. Here, the network node may instruct the RIS to sweep across stage-2 patterns associated with a currently implemented stage-1 codebook codeword. The RIS may perform the sweep, and the UE may perform measurements of the RIS sweep, and transmit the measurements to the network node via the RIS.

At 1116, the network node may obtain information indicating one or more of a level of gain experienced by a first user equipment (UE) as a result of the sweep and a level of interference experienced by a second UE as a result of the sweep. For example, 1116 may be performed by an obtaining component 1240.

In certain aspects, the second codeword is output for transmission in response to the information indicating the communication constraint associated with the second beam between the device and the user equipment (UE).

In certain aspects, the second codeword of the stage-2 codebook is output for transmission to the device in response to one or more of the level of gain and the level of interference.

In certain aspects, the first codeword further indicates angular coordinates of the first incident direction of the first beam.

In certain aspects, the parameter of the second beam comprises one or more of a sidelobe characteristic of the second beam, a width of the second beam, a gain of the second beam, or a variation of the first reflected direction of the second beam.

In certain aspects, the first beam carries a signal output for transmission to the apparatus, and wherein the first reflected direction is for reflecting the signal by the device via the second beam.

Figure 12:
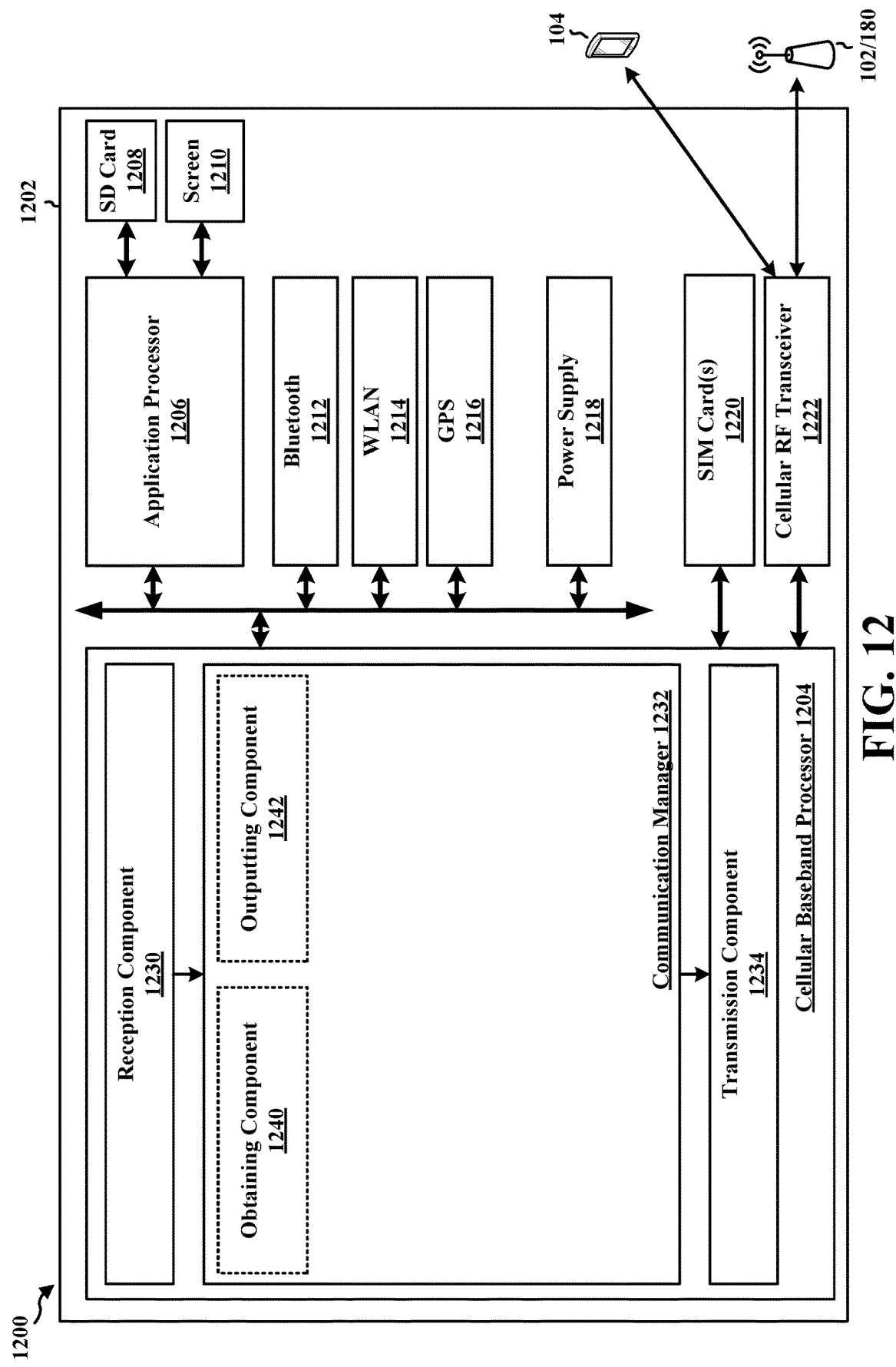
FIG. 12 is a diagram illustrating another example of a hardware implementation for another example apparatus.

FIG. 12 is a diagram 1200 illustrating an example of a hardware implementation for an apparatus 1202. The apparatus 1202 is a BS and includes a baseband unit 1204. The baseband unit 1204 may communicate through a cellular RF transceiver with the UE 104. The baseband unit 1204 may include a computer-readable medium/memory. The baseband unit 1204 is responsible for general processing, including the execution of software stored on the computer-readable medium/memory. The software, when executed by the baseband unit 1204, causes the baseband unit 1204 to perform the various functions described supra. The computer-readable medium/memory may also be used for storing data that is manipulated by the baseband unit 1204 when executing software. The baseband unit 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband unit 1204. The baseband unit 1204 may be a component of the BS 102/180 and may include the memory 376 and/or at least one of the TX processor 316, the RX processor 370, and the controller/processor 375.

The communication manager 1232 includes an obtaining component 1240 configured to obtain information indicating a communication constraint associated with the first beam between the apparatus and the device, or associated with the second beam between the device and a user equipment (UE); and obtain information indicating one or more of a level of gain experienced by a first user equipment (UE) as a result of the sweep and a level of interference experienced by a second UE as a result of the sweep; e.g., as described in connection with 1102 and 1116 of FIG. 11.

The communication manager 1232 further includes an outputting component 1242 configured to output, for transmission to the device, an indication of the third codeword in response to the information indicating the communication constraint associated with the first beam between the apparatus and the device; output, for transmission to a network node, a request for the information indicating the communication constraint, wherein the information indicating the communication constraint is obtained from the network node; output, for transmission to the device, the stage-1 codebook, the stage-2 codebook, and an additional stage-2 codebook for each codeword of the stage-1 codebook other than the first codeword; output, for transmission to a device, a first codeword indicating a first incident direction of a first beam and a first reflected direction a second beam, the first codeword being one of at least one codeword of a stage-1 codebook; output, for transmission to the device, a second codeword of a stage-2 codebook, the stage-2 codebook being associated with the first codeword, the second codeword indicating a parameter of the second beam; and output, for transmission to the device, a request for the device to perform a sweep using one or more codewords of the stage-2 codebook; e.g., as described in connection with 1104, 1106, 1108, 1110, 1112, and 1114 of FIG. 11.

The apparatus may include additional components that perform each of the blocks of the algorithm in the aforementioned flowchart of FIG. 11. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband unit 1204, includes means for obtaining information indicating a communication constraint associated with the first beam between the apparatus and the device, or associated with the second beam between the device and a user equipment (UE); means for outputting, for transmission to the device, an indication of the third codeword in response to the information indicating the communication constraint associated with the first beam between the apparatus and the device; means for outputting, for transmission to a network node, a request for the information indicating the communication constraint, wherein the information indicating the communication constraint is obtained from the network node; means for outputting, for transmission to the device, the stage-1 codebook, the stage-2 codebook, and an additional stage-2 codebook for each codeword of the stage-1 codebook other than the first codeword; means for outputting, for transmission to a device, a first codeword indicating a first incident direction of a first beam and a first reflected direction a second beam, the first codeword being one of at least one codeword of a stage-1 codebook; means for outputting, for transmission to the device, a second codeword of a stage-2 codebook, the stage-2 codebook being associated with the first codeword, the second codeword indicating a parameter of the second beam; means for outputting, for transmission to the device, a request for the device to perform a sweep using one or more codewords of the stage-2 codebook; and means for obtaining information indicating one or more of a level of gain experienced by a first user equipment (UE) as a result of the sweep and a level of interference experienced by a second UE as a result of the sweep.

The aforementioned means may be one or more of the aforementioned components of the apparatus 1202 configured to perform the functions recited by the aforementioned means. As described supra, the apparatus 1202 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

Means for receiving or means for obtaining may include a receiver (such as the receive processor 370) and/or an antenna(s) 320 of the network node/base station 102/180 or the receive processor 356 or antenna(s) 352 of the UE/RIS 350 illustrated in FIG. 3. It should be noted that the receive processor 356 may be used by a RIS controller in communication with the network node. However, the RIS may not decode or otherwise process signals transmitted by the network node intended to be reflected by the RIS. In a reflection scenario, the means for obtaining may simply include antennas 352 of the RIS. Means for transmitting or means for outputting may include a transmitter (such as the transmit processor 316) or an antenna(s) 320 of the network node/base station 102/180 or the transmit processor 368 or antenna(s) 352 of the UE/RIS 350 illustrated in FIG. 3. Means for updating may include a processing system, which may include one or more processors, such as the receive processor 356, the transmit processor 368, and/or the controller 359 of the UE/RIS 350 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the terms "updating" and "determining" (or any variants thereof such as "update" and determine") encompass a wide variety of actions. For example, "updating" and "determining" may include calculating, computing, processing, deriving, investigating, looking up (e.g., looking up in a table, a database or another data structure), ascertaining and the like. Also, "updating" may include replacing modifying, changing, etc.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

Example Aspects

The following examples are illustrative only and may be combined with aspects of other embodiments or teachings described herein, without limitation.

Example 1 is a method for wireless communication at a reconfigurable intelligent surface (RIS), comprising: obtaining, from a network node, a first codeword indicating a first incident direction of a first beam and a first reflected direction of a second beam, the first codeword being one of at least one codeword of a stage-1 codebook; obtaining, from the network node, a second codeword of a stage-2 codebook, the stage-2 codebook being associated with the first codeword, the second codeword indicating a parameter of the second beam; and updating the second beam according to the parameter indicated by the second codeword.

Example 2 is the method of example 1, further comprising: obtaining, from the network node, the stage-1 codebook, the stage-2 codebook, and an additional stage-2 codebook for each codeword of the stage-1 codebook other than the first codeword.

Example 3 is the method of any of examples 1 and 2, wherein the first codeword further indicates angular coordinates of the first incident direction of the first beam.

Example 4 is the method of any of examples 1-3, wherein the parameter of the second beam comprises one or more of a sidelobe characteristic of the second beam, a width of the second beam, a gain of the second beam, or a variation of the first reflected direction of the second beam.

Example 5 is the method of any of examples 1-4, wherein the stage-1 codebook comprises a third codeword indicating a second incident direction of the first beam and a second reflected direction of the second beam, and further comprising: obtaining, from the network node, an indication of the third codeword; and updating: the first incident direction to the second incident direction, and the first reflected direction to the second reflected direction.

Example 6 is the method of any of examples 1-5, further comprising: outputting, for transmission to the network node, an indication of a capability to update the first beam and the second beam according to the stage-1 codebook and the stage-2 codebook, respectively.

Example 7 is the method of any of examples 1-6, further comprising: obtaining a signal from the network node via the first beam, wherein the first reflected direction is for reflecting the signal by the RIS via the second beam.

Example 8 is a method for wireless communication at a network node, comprising: outputting, for transmission to a device, a first codeword indicating a first incident direction of a first beam and a first reflected direction a second beam, the first codeword being one of at least one codeword of a stage-1 codebook; and outputting, for transmission to the device, a second codeword of a stage-2 codebook, the stage-2 codebook being associated with the first codeword, the second codeword indicating a parameter of the second beam.

Example 9 is the method of example 8, further comprising: outputting, for transmission to the device, the stage-1 codebook, the stage-2 codebook, and an additional stage-2 codebook for each codeword of the stage-1 codebook other than the first codeword.

Example 10 is the method of any of examples 8 and 9, further comprising: obtaining information indicating a communication constraint associated with the first beam between the network node and the device, or associated with the second beam between the device and a user equipment (UE).

Example 11 is the method of example 10, wherein the second codeword is output for transmission in response to the information indicating the communication constraint associated with the second beam between the device and the user equipment (UE).

Example 12 is the method of example 10, wherein the stage-1 codebook comprises a third codeword indicating a second incident direction of the first beam and a second reflected direction of the second beam, and further comprising: outputting, for transmission to the device, an indication of the third codeword in response to the information indicating the communication constraint associated with the first beam between the network node and the device.

Example 13 is the method of example 10, further comprising: outputting, for transmission to another network node, a request for the information indicating the communication constraint, wherein the information indicating the communication constraint is obtained from the other network node.

Example 14 is the method of any of examples 8-13, further comprising: outputting, for transmission to the device, a request for the device to perform a sweep using one or more codewords of the stage-2 codebook; and obtain information indicating one or more of a level of gain experienced by a first user equipment (UE) as a result of the sweep and a level of interference experienced by a second UE as a result of the sweep.

Example 15 is the method of example 14, wherein the second codeword of the stage-2 codebook is output for transmission to the device in response to one or more of the level of gain and the level of interference.

Example 16 is the method of any of examples 8-15, wherein the first codeword further indicates angular coordinates of the first incident direction of the first beam.

Example 17 is the method of any of examples 8-16, wherein the parameter of the second beam comprises one or more of a sidelobe characteristic of the second beam, a width of the second beam, a gain of the second beam, or a variation of the first reflected direction of the second beam.

Example 18 is the method of any of examples 8-17, wherein the first beam carries a signal output for transmission to the device, and wherein the first reflected direction is for reflecting the signal by the device via the second beam.

Example 19 is a reconfigurable intelligent surface (RIS), comprising: a transceiver; a memory comprising instructions; and one or more processors configured to execute the instructions to cause the RIS to perform a method in accordance with any one of examples 1-7, wherein the transceiver is configured to: receive the first codeword; and receive the second codeword.

Example 20 is a network node, comprising: a transceiver; a memory comprising instructions; and one or more processors configured to execute the instructions and cause the network node to perform a method in accordance with any one of examples 8-18, wherein the transceiver is configured to: transmit the first codeword; and transmit the second codeword.

Example 21 is an apparatus for wireless communications, comprising means for performing a method in accordance with any one of examples 1-7.

Example 22 is an apparatus for wireless communications, comprising means for performing a method in accordance with any one of examples 8-18.

Example 23 is a non-transitory computer-readable medium comprising instructions that, when executed by an apparatus, cause the apparatus to perform a method in accordance with any one of examples 1-7.

Example 24 is a non-transitory computer-readable medium comprising instructions that, when executed by an apparatus, cause the apparatus to perform a method in accordance with any one of examples 8-18.

Example 25 is an apparatus for wireless communications, comprising: a memory comprising instructions; and one or more processors configured to execute the instructions to cause the apparatus to perform a method in accordance with any one of examples 1-7.

Example 26 is apparatus for wireless communications, comprising: a memory comprising instructions; and one or more processors configured to execute the instructions to cause the apparatus to perform a method in accordance with any one of examples 8-18.

What is claimed is:

1. An apparatus configured for wireless communication, comprising:
    one or more memories, individually or in combination, comprising instructions; and
    one or more processors, individually or in combination, configured to execute the instructions to cause the apparatus to:
        obtain, from a network node, a first codeword indicating a first beam and a first reflected direction associated with a second beam, the first codeword being one of at least one codeword of a stage-1 codebook;
        obtain, from the network node, a second codeword of a stage-2 codebook, the stage-2 codebook being associated with the first codeword, the second codeword indicating a parameter of the second beam;
        update the second beam according to the parameter indicated by the second codeword;
        obtain, from the network node, a signal via the first beam; and
        reflect the signal via the second beam and via the first reflected direction.

2. The apparatus of claim 1, wherein the one or more processors are further configured to cause the apparatus to:
    obtain, from the network node, the stage-1 codebook, the stage-2 codebook, and an additional stage-2 codebook for each codeword of the stage-1 codebook other than the first codeword.

3. The apparatus of claim 1, wherein the first codeword further indicates angular coordinates of a first incident direction associated with the first beam.

4. The apparatus of claim 1, wherein the parameter of the second beam comprises one or more of a sidelobe characteristic of the second beam, a width of the second beam, a gain of the second beam, or a variation of the first reflected direction associated with the second beam.

5. The apparatus of claim 1, wherein the stage-1 codebook comprises a third codeword indicating a second incident direction associated with the first beam and a second reflected direction associated with the second beam, and wherein the one or more processors are further configured to cause the apparatus to:
    obtain, from the network node, an indication of the third codeword; and
    update:
        a first incident direction associated with the first beam to the second incident direction, and
        the first reflected direction to the second reflected direction.

6. The apparatus of claim 1, wherein the one or more processors are further configured to cause the apparatus to:
    output, for transmission to the network node, an indication of a capability to update the first beam and the second beam according to the stage-1 codebook and the stage-2 codebook, respectively.

7. A reconfigurable intelligent surface (RIS), comprising:
    at least one transceiver;
    one or more memories, individually or in combination, comprising instructions; and
    one or more processors, individually or in combination, configured to execute the instructions to cause the RIS to:
        receive, from a network node via the at least one transceiver, a first codeword indicating a first beam and a first reflected direction associated with a second beam, the first codeword being one of at least one codeword of a stage-1 codebook;
        receive, from the network node via the at least one transceiver, a second codeword of a stage-2 codebook, the stage-2 codebook being associated with the first codeword, the second codeword indicating a parameter of the second beam;
        update the second beam according to the parameter indicated by the second codeword;
        receive, from the network node via the at least one transceiver, a signal via the first beam; and
        reflect, via the at least one transceiver, the signal via the second beam and via the first reflected direction.

8. An apparatus configured for wireless communication, comprising:
    one or more memories, individually or in combination, comprising instructions; and
    one or more processors, individually or in combination, configured to execute the instructions to cause the apparatus to:
        output, for transmission to a device, a first codeword indicating a first beam and a first reflected direction associated with a second beam, the first codeword being one of at least one codeword of a stage-1 codebook;
        output, for transmission to the device, a second codeword of a stage-2 codebook, the stage-2 codebook being associated with the first codeword, the second codeword indicating a parameter of the second beam; and
        output a signal for transmission to the device via the first beam, the signal configured to be reflected by the device via the second beam in the first reflected direction.

9. The apparatus of claim 8, wherein the one or more processors are further configured to cause the apparatus to:
    output, for transmission to the device, the stage-1 codebook, the stage-2 codebook, and an additional stage-2 codebook for each codeword of the stage-1 codebook other than the first codeword.

10. The apparatus of claim 8, wherein the one or more processors are further configured to cause the apparatus to:
  obtain information indicating a communication constraint associated with the first beam between the apparatus and the device, or associated with the second beam between the device and a user equipment (UE).

11. The apparatus of claim 10, wherein the second codeword is output for transmission in response to the information indicating the communication constraint associated with the second beam between the device and the user equipment (UE).

12. The apparatus of claim 10, wherein the stage-1 codebook comprises a third codeword indicating a second incident direction associated with the first beam and a second reflected direction associated with the second beam, and wherein the one or more processors are further configured to cause the apparatus to:
  output, for transmission to the device, an indication of the third codeword in response to the information indicating the communication constraint associated with the first beam between the apparatus and the device.

13. The apparatus of claim 10, wherein the one or more processors are further configured to cause the apparatus to:
  output, for transmission to a network node, a request for the information indicating the communication constraint, wherein the information indicating the communication constraint is obtained from the network node.

14. The apparatus of claim 8, wherein the one or more processors are further configured to cause the apparatus to:
  output, for transmission to the device, a request for the device to perform a sweep using one or more codewords of the stage-2 codebook; and
  obtain information indicating one or more of a level of gain experienced by a first user equipment (UE) as a result of the sweep or a level of interference experienced by a second UE as a result of the sweep.

15. The apparatus of claim 14, wherein the second codeword of the stage-2 codebook is output for transmission to the device in response to one or more of the level of gain or the level of interference.

16. The apparatus of claim 8, wherein the first codeword further indicates angular coordinates of a first incident direction associated with the first beam.

17. The apparatus of claim 8, wherein the parameter of the second beam comprises one or more of a sidelobe characteristic of the second beam, a width of the second beam, a gain of the second beam, or a variation of the first reflected direction associated with the second beam.

18. The apparatus of claim 8, further comprising at least one transceiver configured to:
  transmit the first codeword;
  transmit the second codeword; and
  transmit the signal, wherein the apparatus is configured as a network node.

\* \* \* \* \*